(12) United States Patent
Hornung et al.

(10) Patent No.: US 9,497,563 B2
(45) Date of Patent: Nov. 15, 2016

(54) MOBILE DEVICE ACTIVATION

(71) Applicant: Google Inc., Mountain View, CA (US)

(72) Inventors: Zelidrag Hornung, Los Gatos, CA (US); Jason Glasgow, Newton Center, MA (US); Eric R. Shienbrood, Sudbury, MA (US)

(73) Assignee: Google Inc., Mountain View, CA (US)

( * ) Notice: Subject to any disclaimer, the term of this patent is extended or adjusted under 35 U.S.C. 154(b) by 111 days.

(21) Appl. No.: 13/625,626

(22) Filed: Sep. 24, 2012

(65) Prior Publication Data

US 2015/0223006 A1    Aug. 6, 2015

Related U.S. Application Data

(60) Provisional application No. 61/538,773, filed on Sep. 23, 2011, provisional application No. 61/538,777, filed on Sep. 23, 2011.

(51) Int. Cl.
*H04W 4/00* (2009.01)
(52) U.S. Cl.
CPC ..................... *H04W 4/001* (2013.01)
(58) Field of Classification Search
CPC .......................... H04W 4/001; H04W 8/265
See application file for complete search history.

(56) References Cited

U.S. PATENT DOCUMENTS

| | | | | |
|---|---|---|---|---|
| 6,973,627 | B1* | 12/2005 | Appling | G06F 17/30905 707/E17.121 |
| 2004/0137890 | A1* | 7/2004 | Kalke | G06Q 30/012 455/418 |
| 2008/0055613 | A1* | 3/2008 | Hatfield | G06F 17/30899 358/1.2 |
| 2010/0159961 | A1* | 6/2010 | Bowman | H04L 12/581 455/466 |
| 2012/0159295 | A1* | 6/2012 | Rabstejnek | G06F 17/30896 715/205 |
| 2013/0122867 | A1* | 5/2013 | Bayliss | H04L 51/046 455/411 |
| 2014/0235230 | A1* | 8/2014 | Raleigh | G06Q 10/06375 455/419 |

\* cited by examiner

*Primary Examiner* — Mehmood B Khan
(74) *Attorney, Agent, or Firm* — Brake Hughes Bellermann LLP

(57) ABSTRACT

A computer-implemented method includes displaying within a web browser executing on a computing device an offer to activate a data communication service for the computing device to communicate over a cellular network. A communication link is establish, through the web browser, between the computing device and a data plan web portal configured to receive information from a user of the computing device, where the information is used to activate the data communication service. An encrypted message including a unique identifier of the computing device is transmitted from the computing device, through the web browser, to the data plan web portal. A message including instructions to execute a process on the computing device to activate the data communication service for the computing device to communicate over the cellular network is received, through the web browser, at the computing device.

20 Claims, 17 Drawing Sheets

Settings

Search settings

- Basics
- Personal Stuff
- System
- Internet
- Under the Hood
- Users

Internet | Mobile Data

Account Owner

Data Plan
- ○ One Time | Recurring
- ○ 1GB per month for $20
- ○ 3GB per month for $35
- ○ 5GB per month for $50
- ○ 10GB per month for $80

Payment Method: Google Checkout | Visa | Mastercard | Amex
Credit Card No. XXXX XXXX XXXX XXXX
Expiration: Month  Year
Security Code: Security Code
Name on Card: _____ Change
Address: _____ Change Terms of Service    I have read and agree to the following terms of service
☐ Important Plan Information
   Wireless Customer Agreement Cancel | Next

FIG. 9

Settings

Internet | Mobile Data

Account Owner

Search settings

- Basics
- Personal Stuff
- System
- Internet
- Under the Hood
- Users

Data Plan | One Time | Recurring
- ○ 1GB per month for $20
- ○ 3GB per month for $35
- ○ 5GB per month for $50
- ○ 10GB per month for $80

Payment Method:
Credit Card No. XXXX XXXX XXXX 0123 Change | Google Checkout | Visa | Mastercard | Amex
Billing Address:

Terms of Service    I have read and agree to the following terms of service
☐ Important Plan Information
Wireless Customer Agreement Cancel | Next

FIG. 10

Settings

Internet | Mobile Data

Payment Summary

Search settings

- Basics
- Personal Stuff
- System
- Internet
- Under the Hood
- Users

| Qty | Item | Price |
|---|---|---|
| 1 | 1GB per month | $20.00 |
| | Tax (CA): | $2.02 |
| | Total): | $22.02 |

Your credit card will be billed immediately

Credit Card No. XXXX XXXX XXXX 0123 Change
Billing Address:

Terms of Service    I have read and agree to the following terms of service
■ Important Plan Information
Wireless Customer Agreement Back    Submit

FIG. 11

MOBILE DEVICE ACTIVATION

CROSS-REFERENCE TO RELATED APPLICATIONS

This application claims priority to and the benefit of U.S. Provisional Application Ser. No. 61/538,773, entitled "System and Methods for Mobile Device Activation," filed on Sep. 23, 2011, the disclosure of which is hereby incorporated herein by reference in its entirety. This application also claims priority to and the benefit of U.S. Provisional Application Ser. No. 61/538,777, entitled "System and Methods for Mobile Device Activation," filed on Sep. 23, 2011, the disclosure of which is hereby incorporated herein by reference in its entirety.

TECHNICAL FIELD

This description relates to a system and method for web browser-driven mobile device activation.

BACKGROUND

Some mobile computing devices, such as, for example, laptop computers, netbooks, tablets and cell phones can be configured with a data plan that provides service for mobile telephone and mobile Internet access, such as, access to electronic mail, short message service (SMS) (e.g., text messaging) and multimedia messaging service (MMS) through a cellular mobile network (e.g., a CDMA network, a GSM network, a GPRS network, an EV-DO network, an EDGE network, an LTE network, an HSPA+ network, a UMTS network, etc.). Such data plans generally require a user to set up and activate an account associated with the mobile device and pay for the service of the data plan. Such mobile computing devices typically require assignment of a telephone number to the device and activation of the mobile device with respect to the data plan by a carrier, such as, a cellular network carrier. Assignment of the telephone number to the device and activation of the device with respect to the data plan generally requires that the computing device be present on-site at the carrier's place of business to perform the activation. For example, when a user purchases a mobile telephone, the carrier will assign and activate the phone number for the mobile phone, and activate a data plan if purchased with the mobile telephone. Thus, when such a mobile computing device is purchased, for example, from a merchant that is not also a carrier, or on-line, or is purchased by one person for use by another person (e.g., as a gift), the user will need to take the computing device to the carrier's place of business for activation of the device.

Thus, it is desirable to have a system and method for activation of a mobile or portable computing device, such as, for example, a mobile computer, via a website accessible by a user without having to transport the device to a carrier's place of business.

SUMMARY

According to one general aspect, a computer-implemented method includes displaying within a web browser executing on a computing device an offer to activate a data communication service for the computing device to communicate over a cellular network. A communication link is establish, through the web browser, between the computing device and a data plan web portal configured to receive information from a user of the computing device, where the information is used to activate the data communication service. An encrypted message including a unique identifier of the computing device is transmitted from the computing device, through the web browser, to the data plan web portal. A message including instructions to execute a process on the computing device to activate the data communication service for the computing device to communicate over the cellular network is received, through the web browser, at the computing device.

Implementations can include one or more of the following features. For example, the communication link between the computing device and the data plan web portal can be established through an exchange of HTML5 messages within the web browser. The encrypted message including the unique identifier of the computing device can be encrypted with a public key of an operator of the data plan web portal. The data communication service can be a 3G or 4G data service.

The method can further include, after receiving the message, associating a telephone number with the computing device and activating the data communication service for the computing device to communicate over the cellular network, where the telephone number is valid for using the computing device with the cellular network. The method can further include detecting an internal state of the computing device, where the internal state identifies whether the data communication service has been activated on the computing device, and displaying the offer to activate a data communication service for the computing device only when the detected internal state identifies that the data communication service has not been activated on the computing device.

The process to activate the data communication service for the computing device to communicate over cellular network can include reconfiguring a modem of the computing device to communicate over the cellular network. The method can further include transmitting payment information from the computing device to the data plan web portal to pay for the data communications service, and, in response to the transmission of the payment information, receiving from the data plan web portal the message including instructions to execute the process to activate the data communication service, without receiving any of the payment information.

Activating the data communication service on the computing device can include reconfiguring a modem associated with the computing device from a pre-activation state to an activation state. The method can further include, prior to sending the data plan web portal the encrypted message, encrypting the message with a public key associated with the carrier such that the data plan web portal can decrypt the encrypted message with a private key of the carrier. The method can further include, after transmitting from the computing device, through the web browser, to the data plan web portal the encrypted message including the unique identifier of the computing device, placing the computing device into a pre-activation state in which the computing device can communicate with the over the cellular network through a captive portal to send and receive information needed to activate the data communication service for the computing device to communicate over the cellular network, but in which the computing device cannot communicate outside the captive portal over the cellular network.

In another aspect, a computing device can include a modem configured to be capable of communicating over a cellular network, one or more processors configured for executing instructions, and one or more memory devices configured for storing instructions executable by the one or more memories. The instructions include instructions to display within a web browser executing on the computing device an offer to activate a data communication service for the computing device to communicate over the cellular network. The instructions include instructions to establish, through the web browser, a communication link between the computing device and a data plan web portal configured to receive information from a user of the computing device, the information being used to activate the data communication service. The instructions include instructions to transmit from the computing device, through the web browser, to the data plan web portal an encrypted message including a unique identifier of the computing device. The instructions include instructions to receive, through the web browser, at the computing device, a message including instructions to execute a process on the computing device to activate the data communication service for the modem of the computing device to communicate over the cellular network.

Implementations can include one or more of the following features. For example, the communication link between the computing device and a data plan web portal is established through an exchange of HTML5 messages within the web browser. The encrypted message including the unique identifier of the computing device can be encrypted with a public key of an operator of the data plan web portal.

The instructions can further include instructions to, after receiving the message, associate a telephone number with the computing device and activate the data communication service for the computing device to communicate over the cellular network, where the telephone number is valid for using the computing device with the cellular network.

The instructions can further include instructions to detect an internal state of the computing device, where the internal state identifies whether the data communication service has been activated on the computing device, and to display the offer to activate a data communication service for the computing device only when the detected internal state identifies that the data communication service has not been activated on the computing device. The process to activate the data communication service for the computing device to communicate over cellular network can include reconfiguring the modem of the computing device to communicate over the cellular network.

The instructions can further include instructions to transmit payment information from the computing device to the data plan web portal to pay for the data communications service, and, in response to the transmission of the payment information, receive from the data plan web portal the message including instructions to execute the process to activate the data communication service, without receiving any of the payment information. Activating the data communication service on the computing device can include reconfiguring the modem associated with the computing device from a pre-activation state to an activation state. The instructions can further include instructions to, prior to sending the data plan web portal the encrypted message, encrypt the message with a public key associated with the carrier such that the data plan web portal can decrypt the encrypted message with a private key of the carrier. The data communication service can be a 3G or 4G data service.

The instructions can further include instructions to, after transmitting the encrypted message including the unique identifier of the computing device from the computing device, through the web browser, to the data plan web portal, place the computing device into a pre-activation state in which the computing device can communicate with the over the cellular network through a captive portal to send and receive information needed to activate the data communication service for the computing device to communicate over the cellular network, but in which the computing device cannot communicate outside the captive portal over the cellular network.

The details of one or more implementations are set forth in the accompanying drawings and the description below. Other features will be apparent from the description and drawings, and from the claims.

BRIEF DESCRIPTION OF THE DRAWINGS

FIGS. 9-17 each illustrate a different example screenshot of a user interface of a data plan web portal associated with a carrier of a data communication service provided to a computing device.

DETAILED DESCRIPTION

Apparatus and methods are described herein to provide for activation of a data communications service on a mobile computing device, such as, for example, a 3G or 4G data communications service or another type of data communications service using a cellular network, on a mobile computing device that provides service on the computing device for mobile telephone and mobile Internet access, such as, access to electronic mail, short message service (SMS) (e.g., text messaging) and multimedia messaging service (MMS). As described herein, the web browser of the computing device can be configured to provide a connection bridge or communication link between a service carrier or provider of such a data communications service and the computing device. The web browser can access a data plan web portal associated with a carrier server of a data communications service (e.g., a cellular network) and provide a unique identifier of the computing device to the data plan web portal, while maintaining privacy of sensitive information associated with the computing device. The carrier server can, through a served web page, access an activation function of the computing device through a special application program interface (API) that is exposed to the served web page by the web browser.

The system and methods described herein can provide for communication between a web browser (e.g., software) of a computing device and a modem (e.g., hardware) of the computing device. The system includes an API that allows a web browser executing on the computing device to communicate with the carrier, so that the web browser and the carrier can exchange information necessary to activate the computing device for use with, for example, a cellular network. Mechanisms are provided for customizing a user's experience within the web browser when activating the computing device for use with the cellular network. The experience can be customized based on the particular cellular network provider that is providing or offering network access to the computing device.

Figure 1:
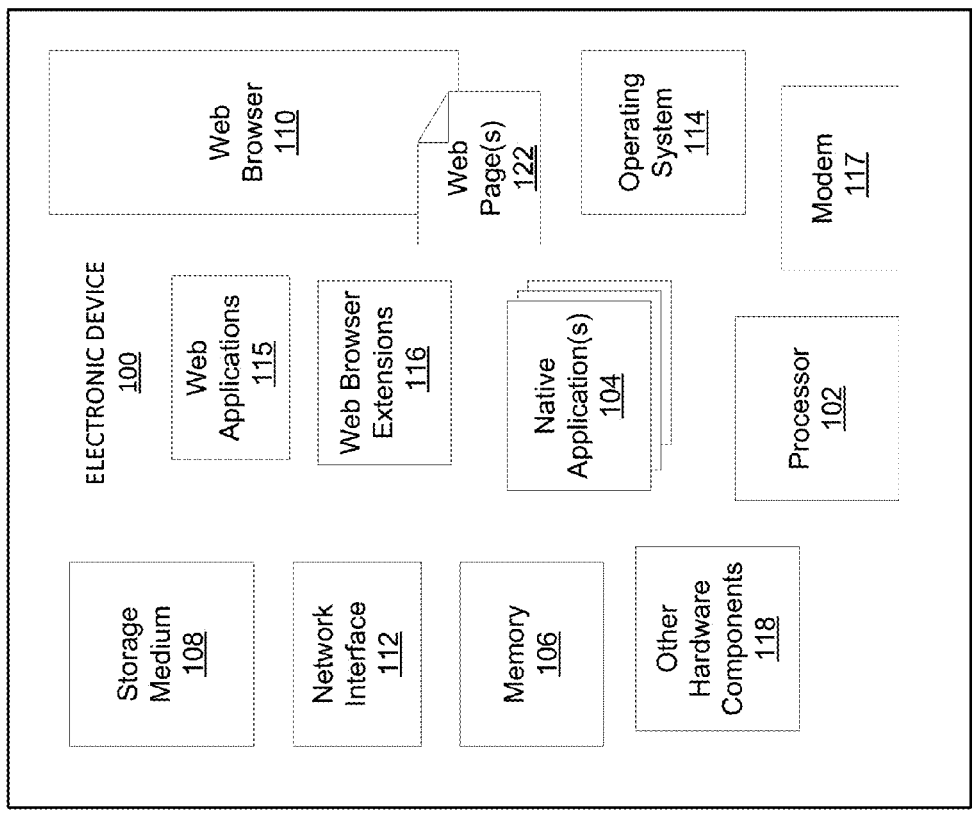
FIG. 1 is a schematic block diagram of a computing device, according to an implementation.

FIG. 1 is a schematic illustration of a computing device 100 that can be, for example, a portable or mobile computing device, such as, a smartphone, a laptop computer, a netbook, or a tablet. The computing device 100 can include one or more processors 102 configured to execute one or more machine executable instructions or pieces of software, firmware, or a combination thereof. The computing device 100 can include, a memory 106 configured to store one or more pieces of data, either temporarily, permanently, semi-permanently, or a combination thereof. Further, the memory 106 may include volatile memory, non-volatile memory or a combination thereof. In some embodiments, the computing device 100 may include one or more network interfaces 112 (which may include a modem) configured to associate with and communicate via one or more communication networks (e.g., a wired network, a wireless network, a cellular network, etc.). In various embodiments, the computing device 100 may include a storage medium 108 configured to store data in a semi-permanent or substantially permanent form. In various embodiments, the storage medium 108 may be included by the memory 106. In various embodiments, the computing device 100 may include one or more other hardware components not shown in FIG. 1 (e.g., a display or monitor, a keyboard, a touchscreen, a camera, a fingerprint reader, a video processor, etc.).

In various embodiments, the computing device 100 may include an operating system (OS) 114 configured to provide one or more services to an application on the computing device 100 and manage or act as an intermediary between the applications and the various hardware components (e.g., the processor 102, the network interface 112, etc.) of the computing device 100. In such an embodiment, the computing device 100 may include one or more native applications 104, which may be installed locally (e.g., within the storage medium 108, etc.) and configured to be executed directly by the processor 102 and directly interact with the OS 114. In such an embodiment, the native applications 104 may include pre-compiled machine executable code. In some embodiments, the native applications 104 may include a script interpreter (e.g., C shell (csh), AppleScript, AutoHotKey, etc.) or a virtual machine (e.g., the Java Virtual Machine, the Microsoft Common Language Runtime, etc.) that are configured to translate source or object code into executable code which is then executed by the processor 102.

The computing device 100 includes a web browser 110 configured to access a web site or a collection of web pages, scripts, etc. from a physically remote server or web server. In some embodiments, the web browser 110 may be included as one of the native applications 104 or as a portion of the operating system 114.

In this context, a "web page" includes a file or document which is a portion of a web site. In various embodiments, such web pages may include a file formatted as Hypertext Markup Language (HTML), Cascading Style Sheets (CSS), JavaScript, Extensible Markup Language (XML), such as, a XHTML (Extensible HyperText Markup Language) file, an Adobe Flash file, images, videos, etc. In various embodiments, the web browser 110 may process one or more web pages in order to render one web page. For example, an HTML web page may be modified or include other web pages, such as, JavaScript scripts, JavaScript programs, JavaScript source code, a CSS file, various images, etc. It is understood that the above is merely one illustrative example to which the disclosed subject matter is not limited.

In this context, a "web site" may include a collection or grouping of related web pages that are generally viewable or understandable (once rendered by the web browser 110) to a user of the computing device 100. In various embodiments, when a web site is accessed via a communications network, the web site may be accessed via the Hypertext Transfer Protocol (HTTP) or Hypertext Transfer Protocol Secure (HTTPS). It is understood that the above is merely one illustrative example to which the disclosed subject matter is not limited.

In various embodiments, the web browser 110 may include or be associated with one or more web applications 115. In this context, a "web application" may be configured to help a user, via the web site of the web application 115, complete a single task or multiple tasks. In such an embodiment, the web application 115 may be configured to be executed or interpreted by the web browser 110. This is compared with the native applications 104 that include machine executable code and are configured to be executed directly by the processor 102 or via the operating system 114. Whereas, a web application 115 may be incapable of execution or display without the aid of the web browser 110.

Web applications can be "hosted applications" or "packaged applications." Hosted applications may include at least a portion of a web site which itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged apps to change the way the browser behaves or looks.

In various embodiments, the web browser 110 may include or be configured to interact with one or more browser extensions 116. In this context, a "browser extension 116" may include one or more web pages (e.g., web page 122, etc.) packaged or grouped together as a definable whole, and configured to add functionality to the web browser 110. In one implementation, a browser extension 116 may add functionality to the browser 110 by providing a dedicated communication channel between the browser 110 and a server associated with a particular cellular network service provider (e.g., Verizon, AT&T, Sprint, etc.) through which the browser and the provider can exchange information to activate the computing device with respect to a data plan provided by the service provider.

Figure 2:
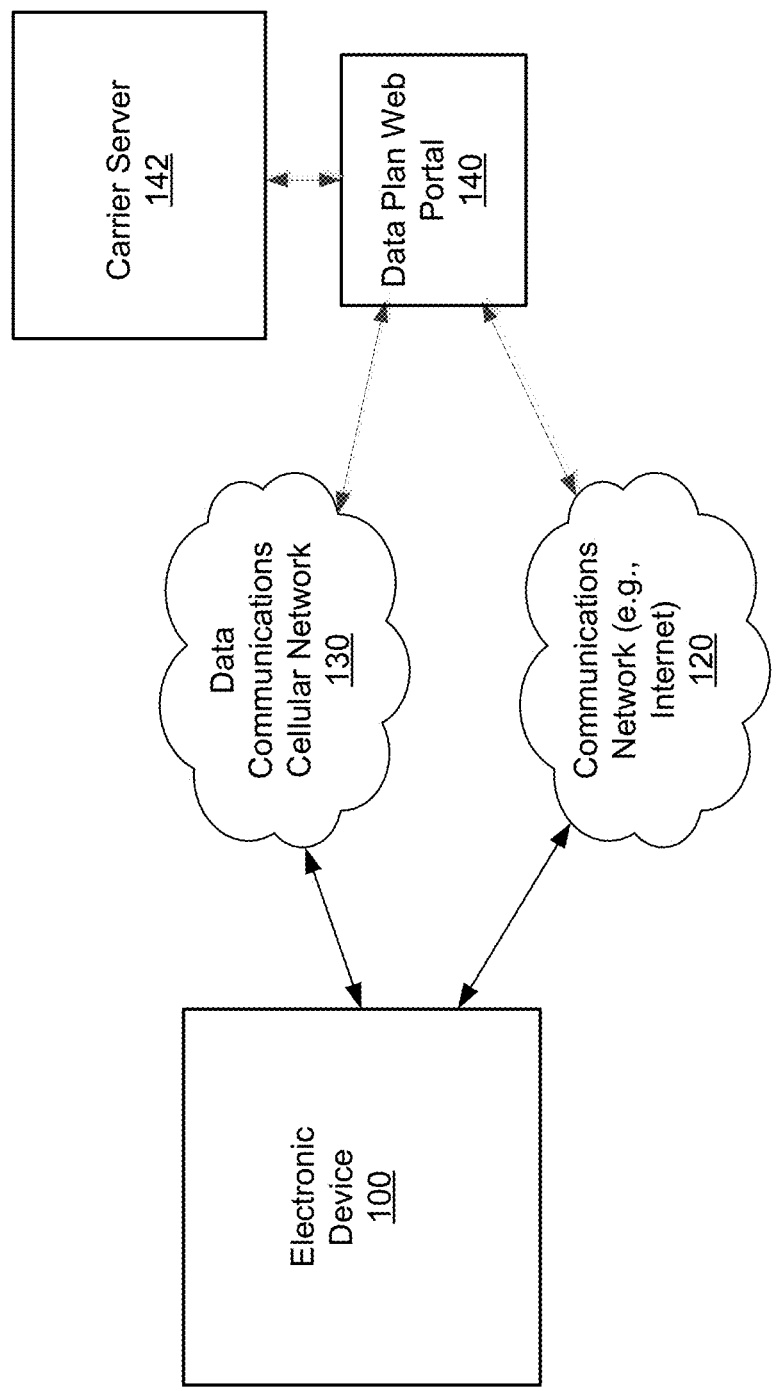
FIG. 2 is a schematic block diagram of the computing device of FIG. 1 and a data plan web portal associated with a carrier.

As shown in FIG. 2, the computing device 100 can be configured to access a communications network 120, such as the Internet, using a wired or wireless (e.g., Wi-Fi) connection via the network interface 112. A user of the computing device 100 may also desire to have access to a cellular data communications network 130, such as a cellular 3G or 4G communications network, using a data communications network connection, to enable access to the data communications network 130 while traveling and/or out of range of a wired or Wi-Fi connection.

Typically, a user of a mobile computing device desiring such access to a data communications service, such as, a 3G communications service, has an account created by the service carrier at the point of sale of the computing device. Thus, if such a computing device is purchased, for example, via an on-line entity or an entity other than the carrier, or the computing device is purchased as a gift for a user other than the purchaser, or a user decides at a time after purchasing the computing device to add such a data communications service, the user of the computing device must travel to a place of business for such a service provider to have the service added to their device.

As described herein, the computing device 100 can be configured to allow a user of the computing device 100 to create an account and activate a data communications service on the computing device 100 without the computing device 100 being physically located at the service provider's place of business. Specifically, as described in more detail below, the web browser 110 of the computing device 100 can be configured to provide a connection bridge or communications link between a service carrier or provider of such a data communications service 130 (e.g., 3G communications service) and the computing device 100.

As shown in FIG. 2, the web browser 110 of the computing device 100 can access a data plan web portal 140 that is associated with a carrier server 142 of a data communications service carrier (e.g., cellular network carrier) and provide information about the computing device 100, such as for example, a unique identifier associated with the computing device 100, to the data plan web portal 140, while maintaining security of sensitive information associated with the computing device 100. The data plan web portal 140 can be configured to handle the selection of a data plan and the payment processing for adding a data plan to the computing device 100. The data plan web portal 140 can be included as part of the carrier server 142, or can be included within a different third party server. For example, a third party server can be associated with an e-commerce website, such as, Amazon. In some implementations, the web browser 110 can access and communicate with the data plan web portal 140 via the communications network 120 (e.g., the Internet) using a wired or wireless connection. In some implementations, the web browser 110 can access and communicate with the data plan web portal 140 via the data communications service of the carrier (e.g., a cellular network) using a limited or temporary access credential to access the data communications service. When the data plan web portal 140 is provided by a third party, the third party can gather a unique identifier associated with the computing device 100, and provide the identifier to the carrier so that the carrier can activate the computing device 100 for use with the carrier's cellular network.

In another implementation, the web browser can communicate with a data plan portal 140 operated by a third party server to sign up and pay for a data plan for use with data communications service provided by the carrier (e.g., a cellular network). After signup and payment, the data plan portal 140 operated by a third party server can send a token to the web browser, which the web browser can use to prove to the carrier that payment for the data plan has been made. The web browser executing on the computing device can send the token to the carrier along with a unique identifier of the device (or the carrier can pull this information from the browser via an API that is accessible to a web page that is associated with the carrier), and based on the token and the unique identifier the carrier can communicate with the web browser to activate the computing device for use with the carrier's cellular network.

The computing device 100 also includes a modem 117. The modem 117 can have an over-the-air service provisioning (OTA-SP) program preloaded on a module of the modem 117. The OTA-SP can be used by a carrier to activate the carrier's data communications service for the device 100. For example, the data plan portal 140 can communicate with the computing device 100 via the web browser 110. The computing device 100 can then initiate activation of the data communications service using the OTA-SP. The OTA-SP can have a phone number pre-assigned to that computing device 100 such that when the OTA-SP activates the data communications service the pre-assigned phone number can be activated.

When the computing device 100 communicates with the data plan web portal 140 of a carrier server, an API can be used to interface with the web portal. The carrier server can, through a served web page, access an activation function of the computing device through the API that is exposed to the served web page by the web browser running on the device 100. The process of activating the computing device can include reconfiguring a modem of the computing device to communicate over the cellular network. The particular processes of reconfiguring the modem can be straightforward but may be different for different carriers' cellular networks.

In some implementations, before the data communications service is activated for the device 100, the computing device can be placed into a pre-activation state in which the computing device 100 can communicate with the data plan web portal 140 over the cellular network through a captive portal. When communicating through the captive portal, the device 100 and the data plan web portal 140 can exchange information needed to activate the data communication service for the computing device to communicate over the cellular network (e.g., the computing device can transmit its unique identifier to the data plan web portal). However, when network communication for the computing device is limited to the captive portal, the computing device cannot communicate outside the captive portal over the cellular network. Thus, in the pre-activation state, the computing device may be able to communicate just with the carrier over the cellular network in order to exchange the necessary information to launch the activation process on the computing device. However, in the pre-activation state, the computing device may not be able to communicate on the cellular network outside of the captive portal. Rather, only after activation, may the device 100 communicate in an unrestricted fashion over the cellular network. Particular implementations for allowing the carrier service to access the activation function of the computing device through the API are described herein, but it is understood that other implementations also are possible.

In one implementation, a JavaScript interface can be made available to the web pages of the data plan web portal 140, and the data plan web portal 140 can be displayed with an embedded context of the web browser 110 that executes on the client device 100, but the JavaScript interface may not be available to other HTML code running in a the web browser 110 or in the operating system 114. For example, in some implementations the data plan web portal 140 can be hosted in an iFrame under a dedicated network activation page, or in another rendering surface (i.e., a dialog window) of the data plan web portal 140. These interfaces can be JavaScript bindings to a subset of the connection manager interfaces. This approach can be used by an operating system (e.g., the Chrome operating system from Google) or by a browser (e.g. the Chrome browser from Google) to host current web pages of network operators (e.g., carriers, such as, for example, Verizon, AT&T, Sprint, etc.) that can be used to activate the device 100 on the network. Because these JavaScript interfaces are not available to HTML code other than code from specific approved carrier pages, the bindings cannot be used by non-approved code to gather information about the device 100.

In another implementation, a web extension can be created to which this API can be exposed as a part of a private permission granted with the installation of the web extension, which then allows the extension to embed the carrier partner's data plan web portal. Within the embedded context (e.g., an iFrame, browser tag, etc.), the HTML5 "window-.postMessage( )" API can be used to communicate with the carrier's web page on the data plan web portal 140. Different web extensions can be associated with different carriers.

In another implementation, a set of web services that require the user to approve access to them can be provided. This is similar to GPS location services. This has the advantage of working both for web apps and packaged apps that can be installed on and run within the browser.

In some implementations, a "connectionManager" object can be created by the browser 110 and can be available to carrier web pages hosted within the iFrame under the dedicated network activation page. There is no means to construct this object as it is inserted into the name space by the browser.

A number of functions can be used within the API, for example, to provide payment from the client device 100 to the data plan web portal 140 for the user's desired data plan, to provide information about uniquely identifying information of the device 100, to allow the portal 140 to give the user of the device 100 information about alternative data plan options, and to allow the portal to give the device 100 information about the data plan that is active on the device and its current state.

For example, in certain embodiments, a "getDeviceInfo" function can retrieve a list of cellular device objects describing the cellular devices that are attached to the computing device 100. In most cases there will only be one cellular device attached to the computing device 100, but the computing device 100 may include an embedded cellular module as well as a USB cellular dongle.

A "DeviceInfo" object and its derived types can provide containers for transmitting information from the device 100 to the portal 140 about the cellular modems attached to the device 100. For example, a "getServiceInfo" function can retrieve a list of cellular service objects describing the cellular services associated with the device 100. In most cases there will only be a single service for each device, but if there is no radio signal present, there may be no service object. A "setTransactionStatus" function can signal the status of a subscription payment transaction, by transmitting from the portal 140 to the device 100 a string that indicates that the payment transaction completed successfully or that the transaction failed. A "CdmaDeviceInfo" object can transmit information from the device 100 to the portal 140 about the device's Mobile Equipment Identifier ("MEID"), Mobile Directory Number ("MDN"), Mobile Identification Number ("MIN"), and/or ActivationState. A "GsmDeviceInfo" object can transmit information from the device 100 to the portal 140 about the device's International Mobile Equipment Identifier ("IMEI") and International Mobile Subscriber Identity ("IMSI").

A "ScanNetworks" function can start a scan for potentially available GSM networks, and can provide a list of "ScanResult" objects describing the visible networks, which can then be presented to the user. For example, ScanResults can contain information about the availability of a network (e.g., whether its availability is "unknown", "available", "current", or "forbidden"), an ID of the network based on a mobile country code ("MCC") and mobile network code ("MNC") of the network, a short-form name and/or a long-form name of the network operator, an access technology used by the network, (e.g. "GSM", "UMTS", "EDGE", "HSPA", etc.). A "Service" object can be used to represent the current "service" or cellular network on which the device is registered and to set the access point name ("APN") details used for the current service.

Figure 3:
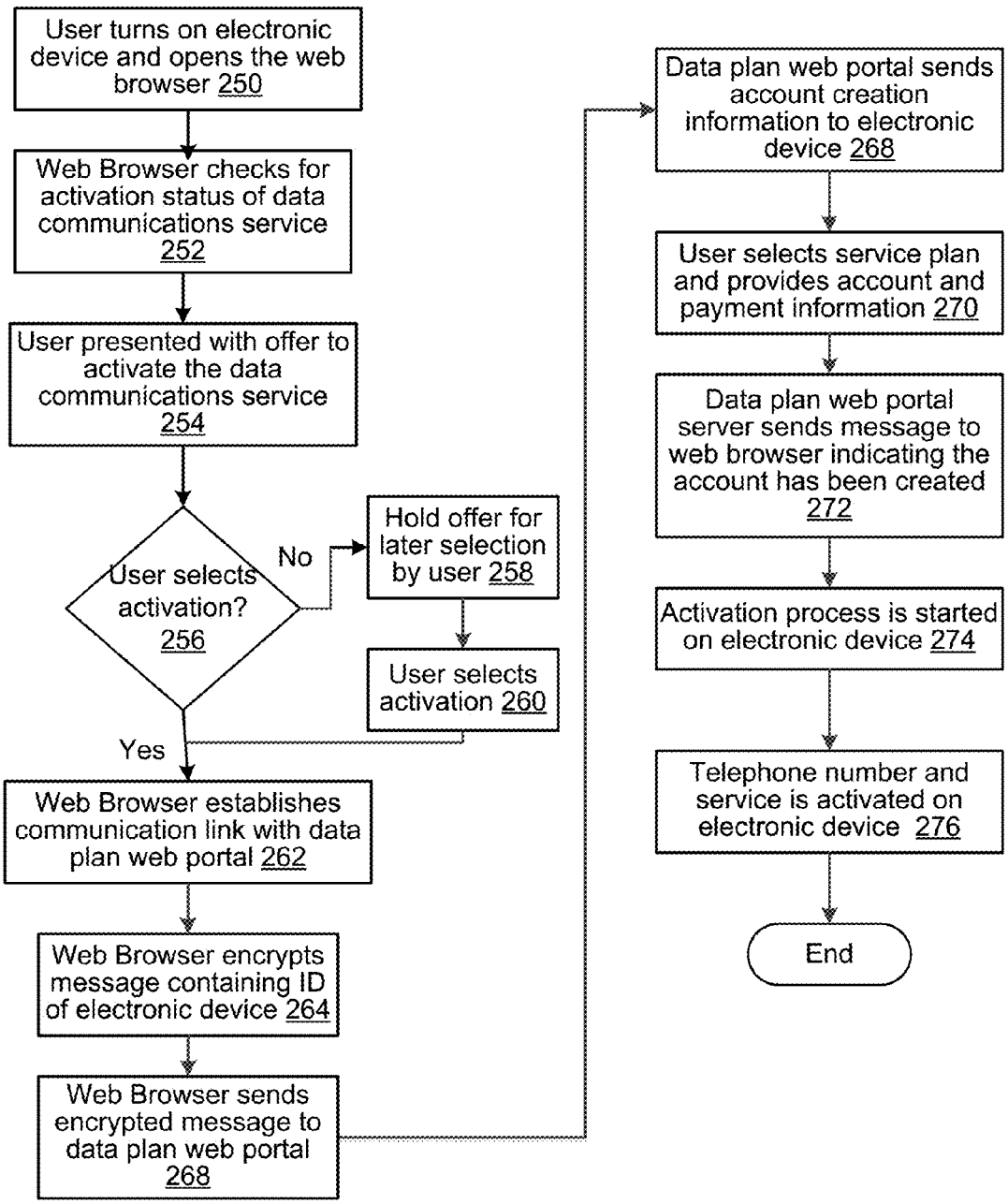
FIG. 3 is a flow chart illustrating a process flow related to activating a data communications service on a computing device via a web browser of the computing device.

FIG. 3 is a flowchart illustrating a method of activating a data communications service on a mobile computing device 100 via a web browser 110 on the computing device 100, according to an implementation. As shown in FIG. 3, at 250, when a user turns on a computing device 100 for the first time (e.g., after purchasing the device), the user can open the web browser 110. For example, the user can click on an icon or otherwise select the web browser 110 to be opened. This action will cause the computing device 100 to open or start the web browser 110. At 252, the web browser 110 can initiate an internal check of the computing device 100 to determine if a particular data communications service has been activated on the computing device 100. In particular, the web browser can detect an internal state of the computing device and/or the modem of the computing device, where the internal state identifies whether the data communication service has been activated on the computing device. If the data communications service has not been activated on the computing device 100, the web browser can present the user with an offer to activate the data communications service, at 254.

Figure 4:
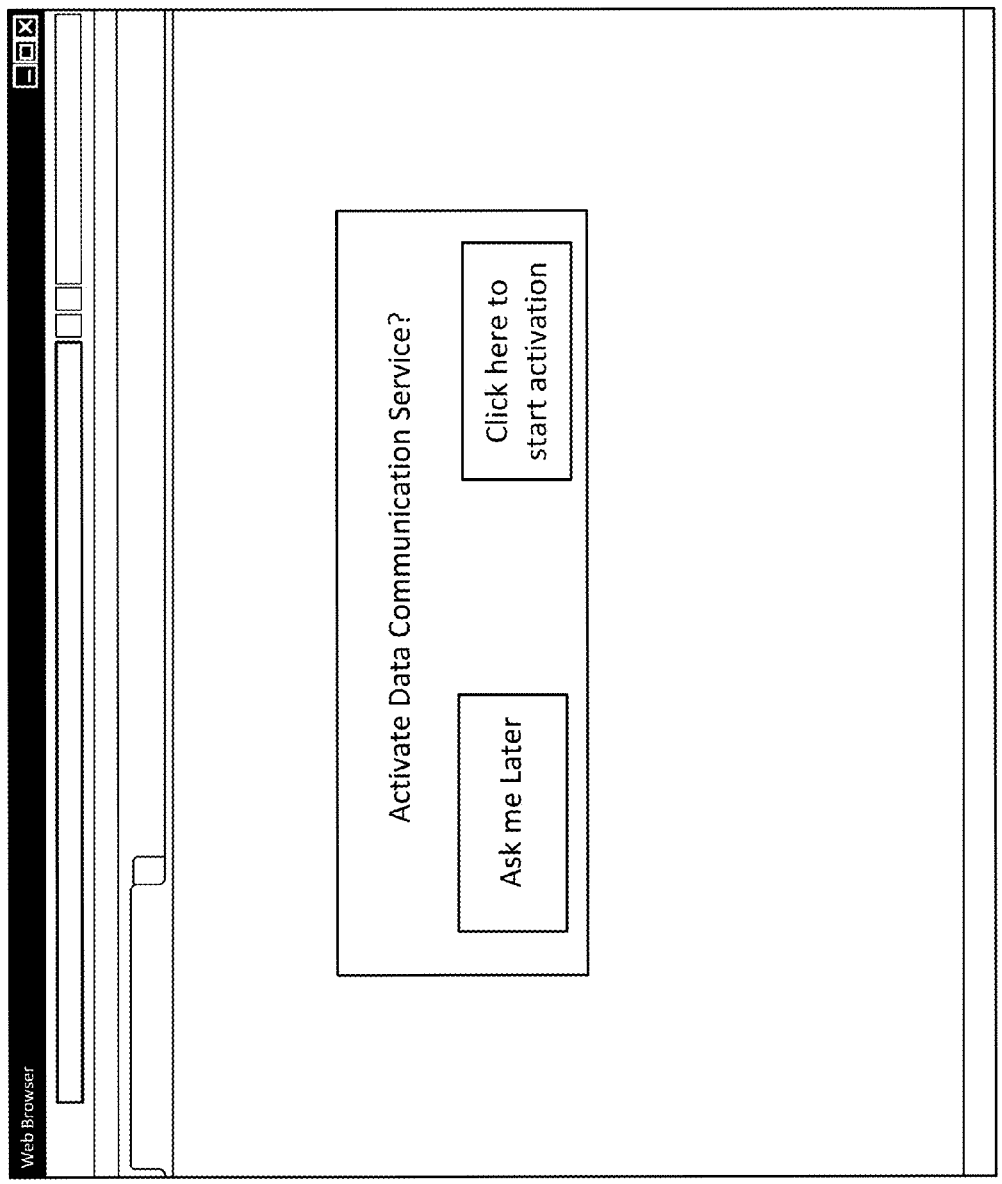
FIG. 4 is an example screen shot of a window within a web browser of a computing device, according to an implementation.

FIG. 4 is an example screen shot illustrating an offer to activate the data communications service presented to the user. In some implementations, the offer to activate the data communications service can be presented in a pop-up window within the web browser environment on the display screen of the computing device 100. In some implementations, the offer to activate the data communications service can be automatically pushed to the user by the browser 110 (e.g., when a user launches a browser, or only when the user launches a browser and the device is not within range of a Wi-Fi node). In some implementations, the offer can be provided to the user as a result of a particular user interaction with the device (e.g., the selection of an activation icon by the user).

At 256, the user can start the activation process. For example, the user can select the "start activation" button (as shown in FIG. 4). If the user does not wish to start the activation process, the user can click or select the "ask me later" button. In some embodiments, the offer to activate the data communications service can include other options, such as, for example, a "no thanks" button (not shown). If the user does not choose to add the data communications service, at 258, the offer to activate the service can be saved and presented to the user at a later time. For example, in some implementations, the offer can automatically be presented to the user, for example, as a pop-up window at certain time intervals.

If the user selects the start activation button at 256 or later at 260, the web browser 110 can then establish a communications link between the computing device 100 and the data plan web portal 140 at 262. For example, the computing device 100 may be configured to access the communications network 120 using a wired or wireless (e.g., Wi-Fi) connection. In some implementations, as discussed above, the computing device 100 can be configured to access and communicate with the data plan web portal 140 via the data communications service (e.g., a 3G network) of the carrier using a limited or temporary access credential. In other words, computing device 100 may be provided with limited access to the data communication service for the limited purpose of establishing a connection with the carrier for the purpose of activating a more comprehensive data plan for the device 100.

To create the link between the computing device 100 and the data plan web portal 140, at 264 the web browser 110 can create a message to send to the data plan web portal 140 that includes the unique identifier of the computing device 100, and can encrypt the message prior to sending it to the data plan web portal 140. Thus, the web browser 110 can be configured to gain access to certain information related to the computing device 100 that typically is not available to a web browser. For example, the web browser 110 can obtain access to the unique identifier of the computing device 100. The unique identifier of the computing device 100 can be, for example, the International Mobile Equipment Identity (IMEI) of the computing device 100 or the Mobile Equipment Identifier (MEID) of the computing device 100. At 266, the encrypted message can be sent to the data plan web portal 140.

Figure 5:
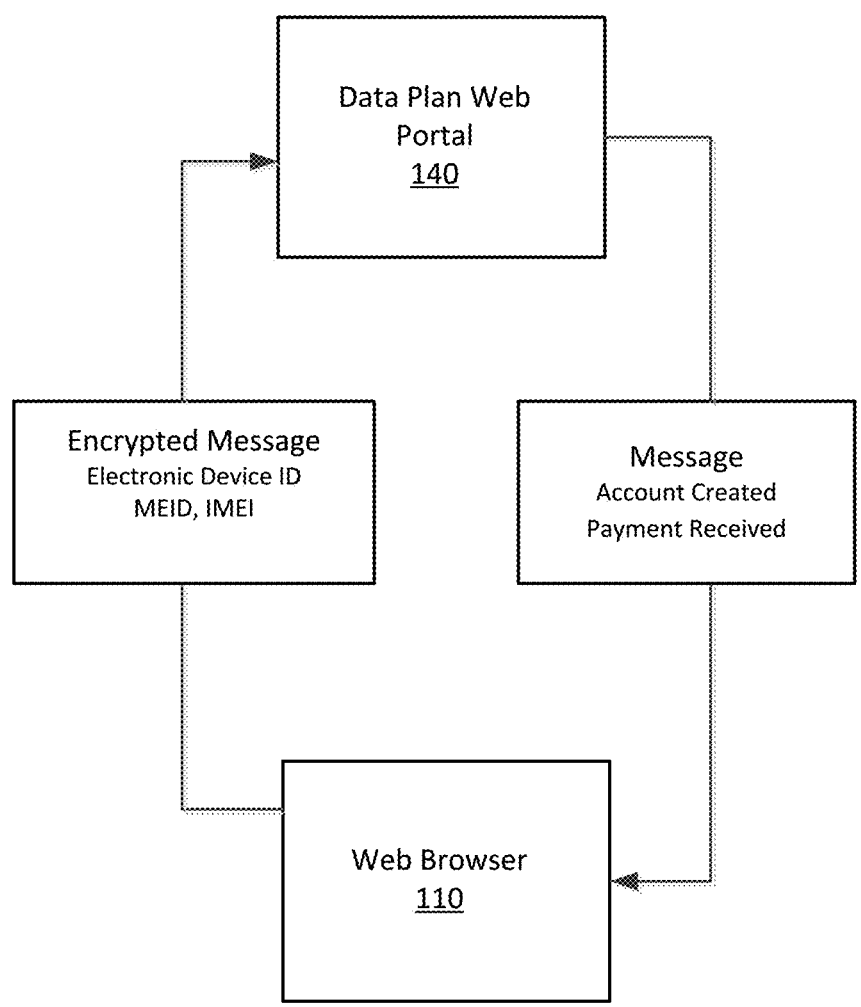
FIG. 5 is a schematic block diagram illustrating a message exchange between a web browser of a computing device and a data plan web portal associated with a carrier, according to an implementation.

In some implementations, the message can be encrypted, for example, using a public key associated with the carrier, or a private key associated with the carrier, and the data plan web portal 140 can decrypt the message using the private key of the carrier. The public key (or private key) associated with the carrier can be stored in association with the web browser 110. The web browser 110, along with the stored public key (or private key), can be preinstalled on the computing device 100 prior to shipping the computing device 100 from a manufacturer to a user, so that when the device 100 is first turned on, the browser 110 has capability to establish a connection to the carrier and to send encrypted information about the device's unique ID to the carrier. FIG. 5 illustrates the message exchange between the web browser 110 and the data plan web portal 140. In other implementations, other encryption techniques can alternatively be used. In some implementations, the message is not encrypted, but rather the system can rely on the special API, which can only be invoked by the web browser 110 on the computing device 100. Thus, because the sensitive information (e.g., unique identifier) associated with the computing device 100 can only be obtained by the web browser 110 through the special API, the sensitive information can be protected without encryption.

Figure 6:
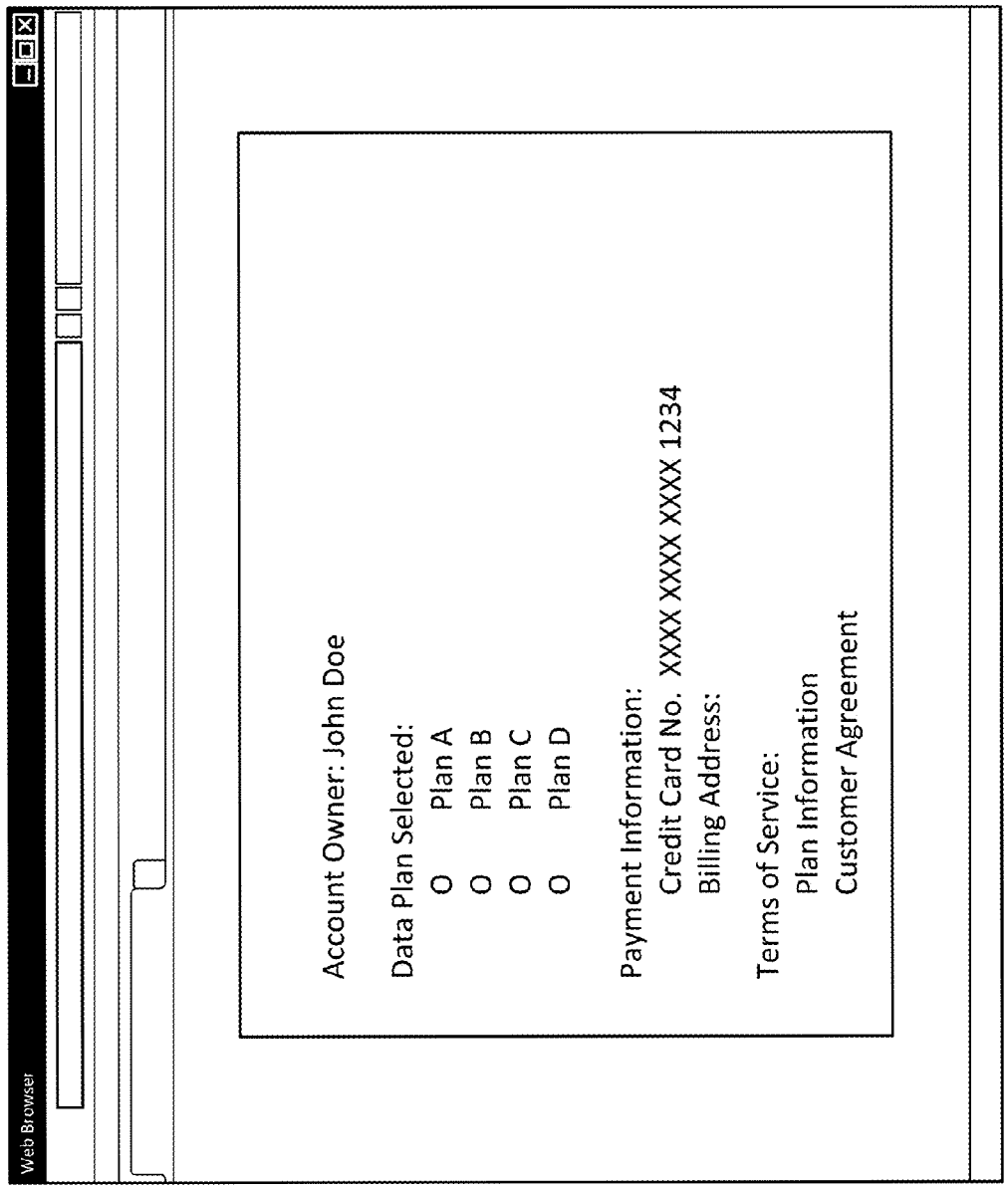
FIG. 6 is an example screen shot of another window within a web browser of a computing device, according to an implementation.

With the communications link established, at 268, the data plan web portal 140 can communicate with the computing device 100 and provide information associated with creating an account and paying for the data communications service. For example, as shown in FIG. 6, the user can be presented with a user interface window that allows the user and the data plan web portal 140 associated with the carrier to communicate and exchange information needed to create an account with the carrier for the user of the computing device 100. In some implementations, the user interface between the data plan web portal 140 and the computing device 100 includes the data plan web portal interface window displayed on the computing device 100 in an iFrame. For example, an iFrame can make the data plan web portal user interface appear to be an integral part of another page. Thus, from a user's perspective, the user will be dealing with only one web page, but parts of that page (iFrames) can be served from different entities, e.g., from the data plan web portal 140.

Figure 7:
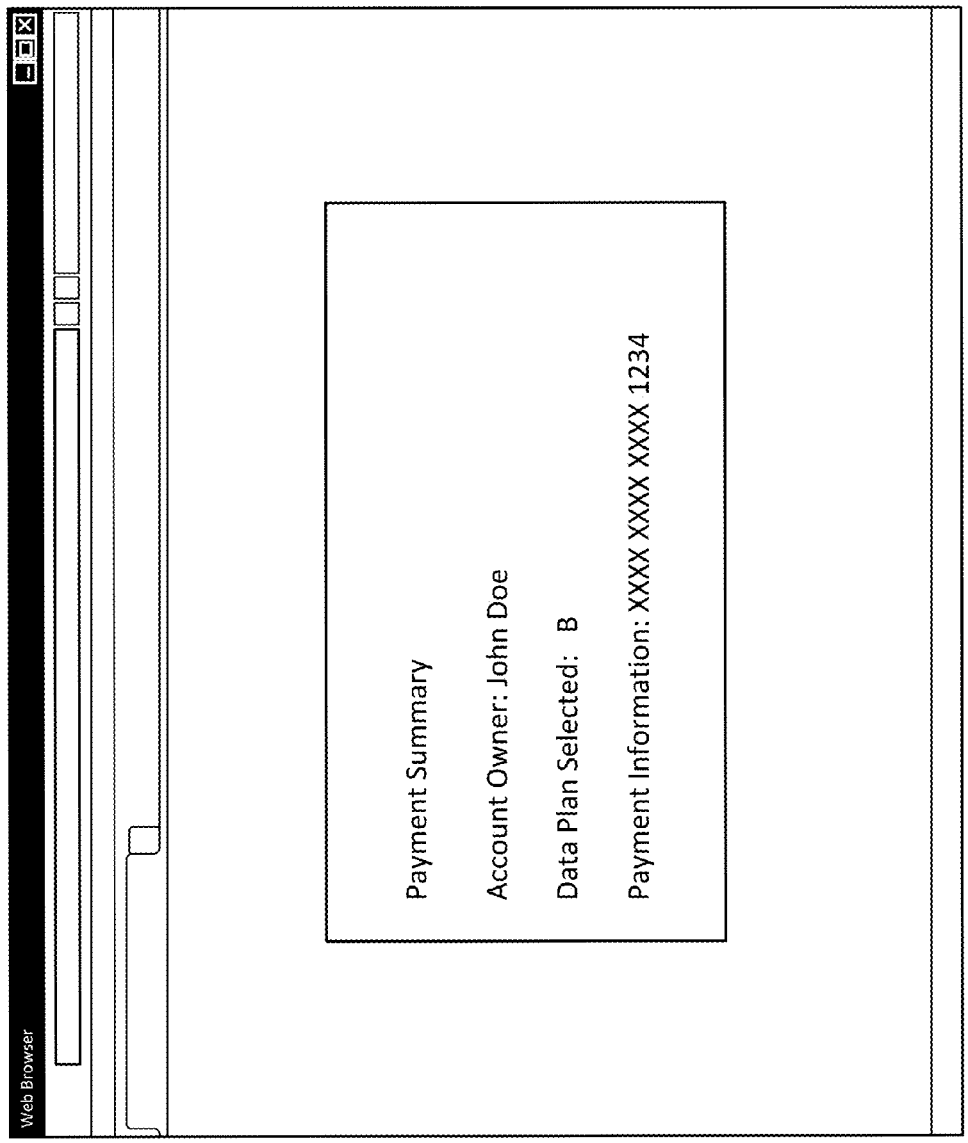
FIG. 7 is an example screen shot of another window within a web browser of a computing device, according to an implementation.

At 270, the user can select a data plan and provide account and payment information to the data plan web portal 140. For example, as shown in the example screen shot of FIG. 6, the user can provide information, such as, for example, the account holder's name, and can select a desired data plan. The user can also provide payment information (e.g., credit card information) and other information as needed to create an account with the carrier. Other information, such as, the terms of the agreement, and service plan information can also be provided. It should be understood that these are just examples of the information that can be exchanged between the data plan web portal 140 and the computing device 100 to create an account with the carrier (e.g., the provider of the cellular communications service). As shown in the example screen shot of FIG. 7, after the account has been set-up and payment has been received, a payment summary screen can be presented to the user of the computing device 100.

After the account has been created, at 272, the data plan web portal 140 can send a message to the web browser 110 of the computing device 100 that indicates that the account has been created and payment has been received (see, e.g., FIG. 5). At 274, the activation of the data communications service can be started at the computing device 100 via the OTA-SP on the modem of the computing device 100 as described above. At 276, a telephone number assigned to the computing device 100 can be activated, and the data communications service can be activated.

Figure 8:
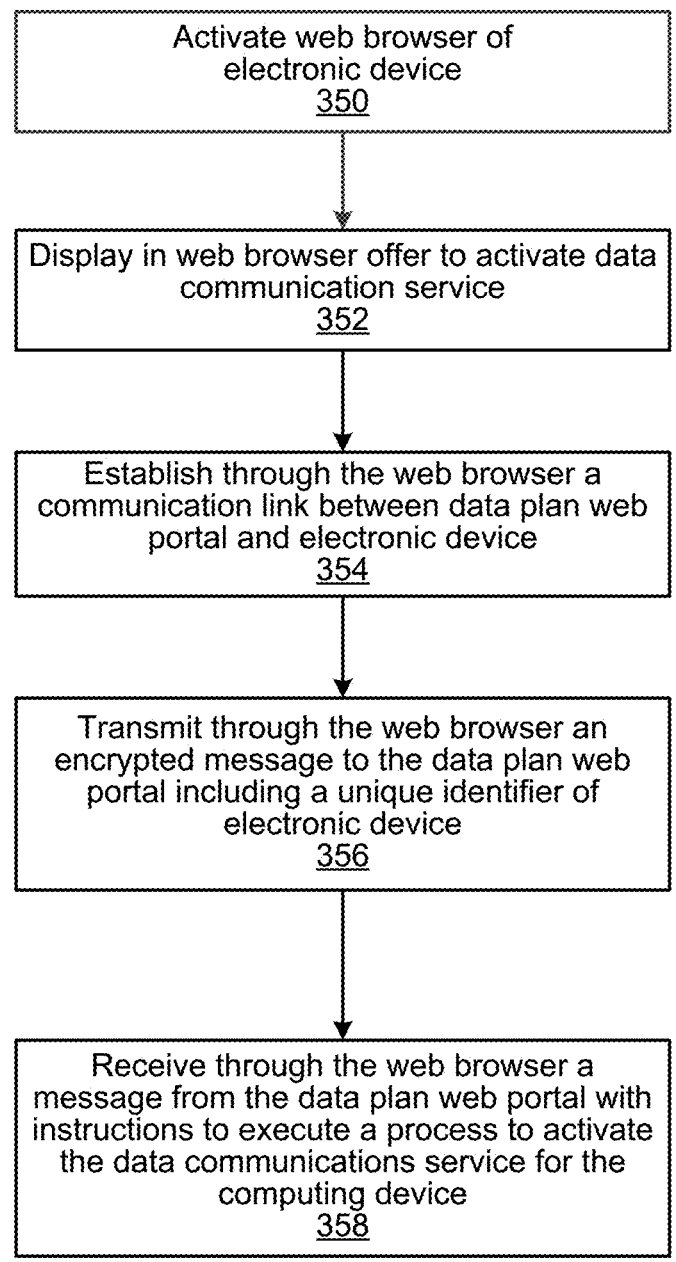
FIG. 8 is a flowchart illustrating a method of activating a data communications service on a mobile device via a web browser.

FIG. 8 illustrates a flowchart of a method of activating a mobile computing device (e.g., 100) according to another implementation. At 350, a web-browser (e.g., 110) is activated within a computing device. For example, a user of the computing device can start the computing device and open the web browser. At 352, an offer to activate a paid cellular data communications service (e.g., a 3G or 4G communications service) on the computing device is displayed within the web browser of the computing device. At 354, a communications link can be established between a data plan web portal (e.g., 140) associated with a carrier server (e.g., 142) of the data communications service (e.g., 130), and the computing device, where the communications link is configured to receive information to activate the data communication device from a user of the computing device. At 356, an encrypted message can be transmitted to the data plan web portal and the message can include a unique identifier of the computing device, such as, for example, a MEID or an IMEI associated with the computing device. At 358, a message is received at the computing device, where the message includes instructions to execute a process on the computing device to activate the data communications service for the computing device over the cellular network.

FIGS. 9-17 illustrate various example screenshots of a user interface of a data plan web portal associated with a carrier of a data communication service provided to a computing device, as described herein. FIG. 9 illustrates an example of a screenshot illustrating a user interface of a data plan web portal associated with a carrier of a data communication service, where an interface to the web portal can be provided within the web browser of the computing device. In this example, the user interface screen associated with the data plan web portal is displayed within an Internet Settings tab of the web browser. A sidebar menu of the web browser is visible providing a tie-in between the web browser and the data plan web portal user interface. The user interface of the data plan web portal can include, for example, information associated with the account owner, a selection of data plans, payment information, such as, a credit card number, and other information, such as, for example, information about the data plan and customer agreement information. The user can enter payment information in the fields provided under the Payment Method heading.

FIG. 10 is an example of a screenshot illustrating a user interface of the data plan web portal displayed within the web browser as with FIG. 9 with a sidebar of the web browser visible to the user. This screen shot shows that the payment information has been entered.

FIG. 11 is an example of a screenshot illustrating a Payment Summary page displayed within an Internet Settings tab of the web browser. For example, after the user has provided the information in the user interface screen of FIGS. 9 and 10, and has clicked the Next button, the Payment Summary screen can be provided to show that payment has been processed. As with FIGS. 9 and 10, the sidebar menu of the web browser is visible providing a tie-in between the web browser and the carrier user interface.

Figure 12:

FIG. 12 is another example of a screenshot illustrating a user interface of a data plan web portal associated with a carrier of a data communication service that can be provided within the web browser of the computing device. In this example, the user interface screen associated with the data plan web portal is displayed within an Internet Settings tab of the web browser as described above for FIG. 9, but does not include a sidebar of the web browser. As with the previous example, the user interface of the data plan web portal can include, for example, information associated with the account owner, a selection of data plans, payment information, such as, a credit card number, and other information, such as, for example, information about the data plan and customer agreement information.

Figure 13:

FIG. 13 illustrates another example screenshot of a user interface of a data plan web portal associated with a carrier of a data communication service that can be provided within the web browser of the computing device. In this example, the user interface screen associated with the data plan web portal is displayed within a single tab of the web browser, and the information is provided in an accordion style. For example, a user first selects an icon to bring up the plan options as shown in FIG. 13. After the plan has been selected, the user can click on each of the other listed actions, such as, Confirm account owner, Select payment method and Complete sign-up, in a sequential manner to open the information related to those action items. In such an implementation, the visual display can be more focused on one or more actions. Other information can also be provided within the screen since the space required to display the action items is not as encompassing.

Figure 14:
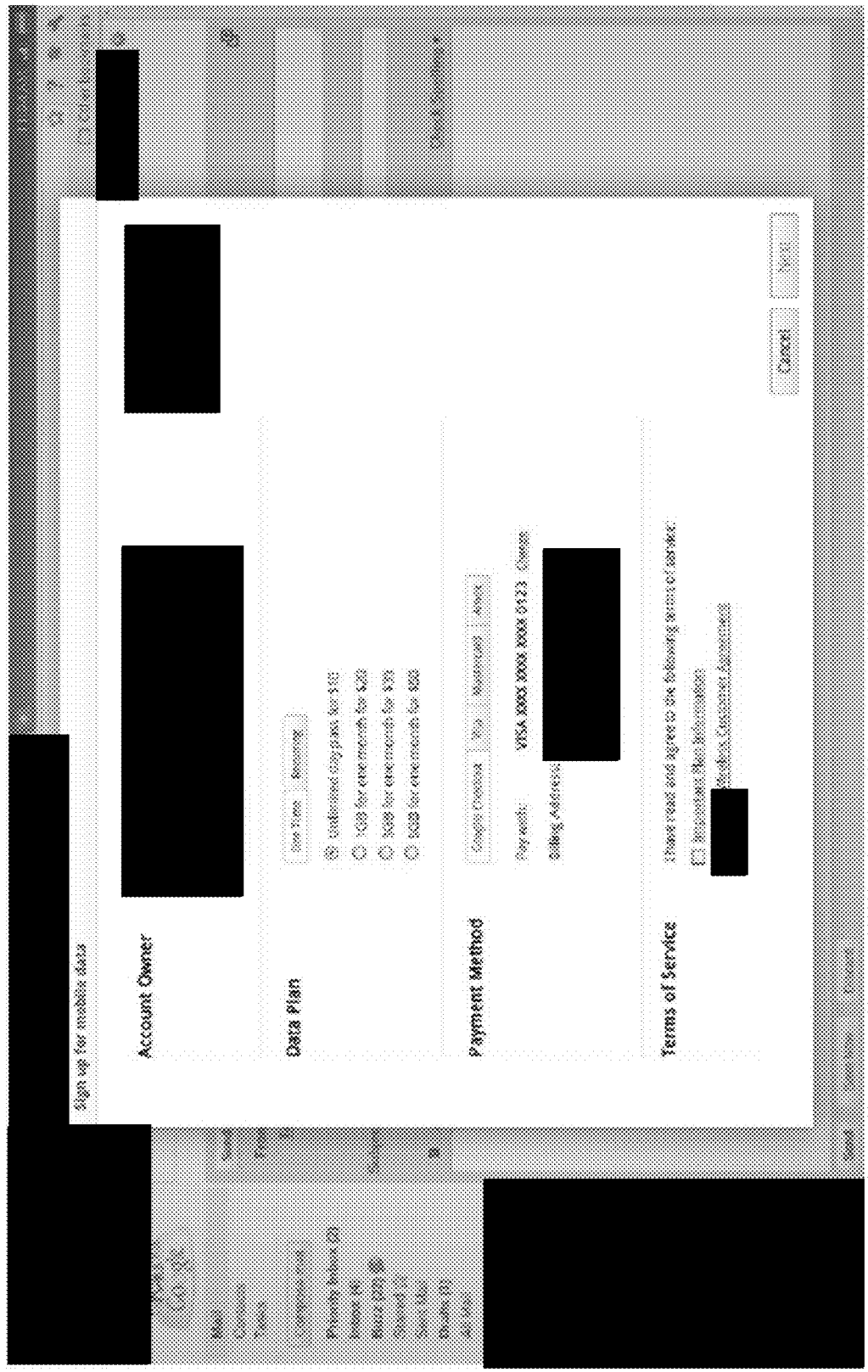

FIG. 14 illustrates another example of a screenshot of a user interface of a data plan web portal associated with a carrier of a data communication service that can be provided within the web browser of the computing device. In this example, the user interface screen is provided in the form of a modal popup and the web browser is visible behind the user interface screen of the data plan web portal. The user interface screen of the data plan web portal can include, for example, information associated with the account owner, a selection of data plans, payment information, such as, a credit card number, and other information, such as, for example, information about the data plan and customer agreement information.

Figure 15:
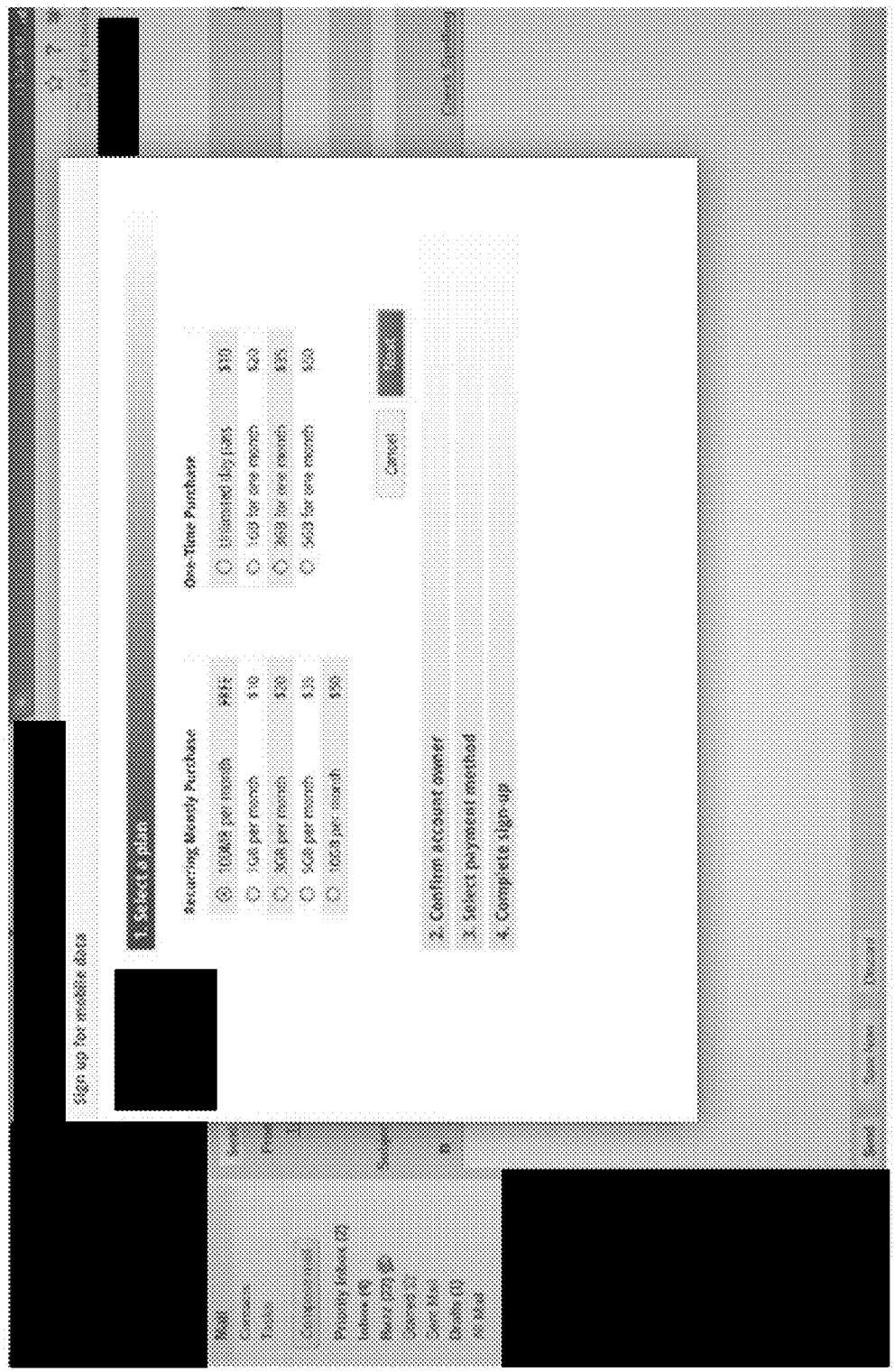

FIG. 15 illustrates another example of a screenshot of a user interface of a data plan web portal associated with a carrier of a data communication service that can be provided within the web browser of the computing device. In this example, the user interface screen is provided in the form of a modal popup and the web browser is visible behind the user interface screen of the data plan web portal as with the example of FIG. 14, but the information displayed is provided in an accordion style as with the example of FIG. 13.

Figure 16:
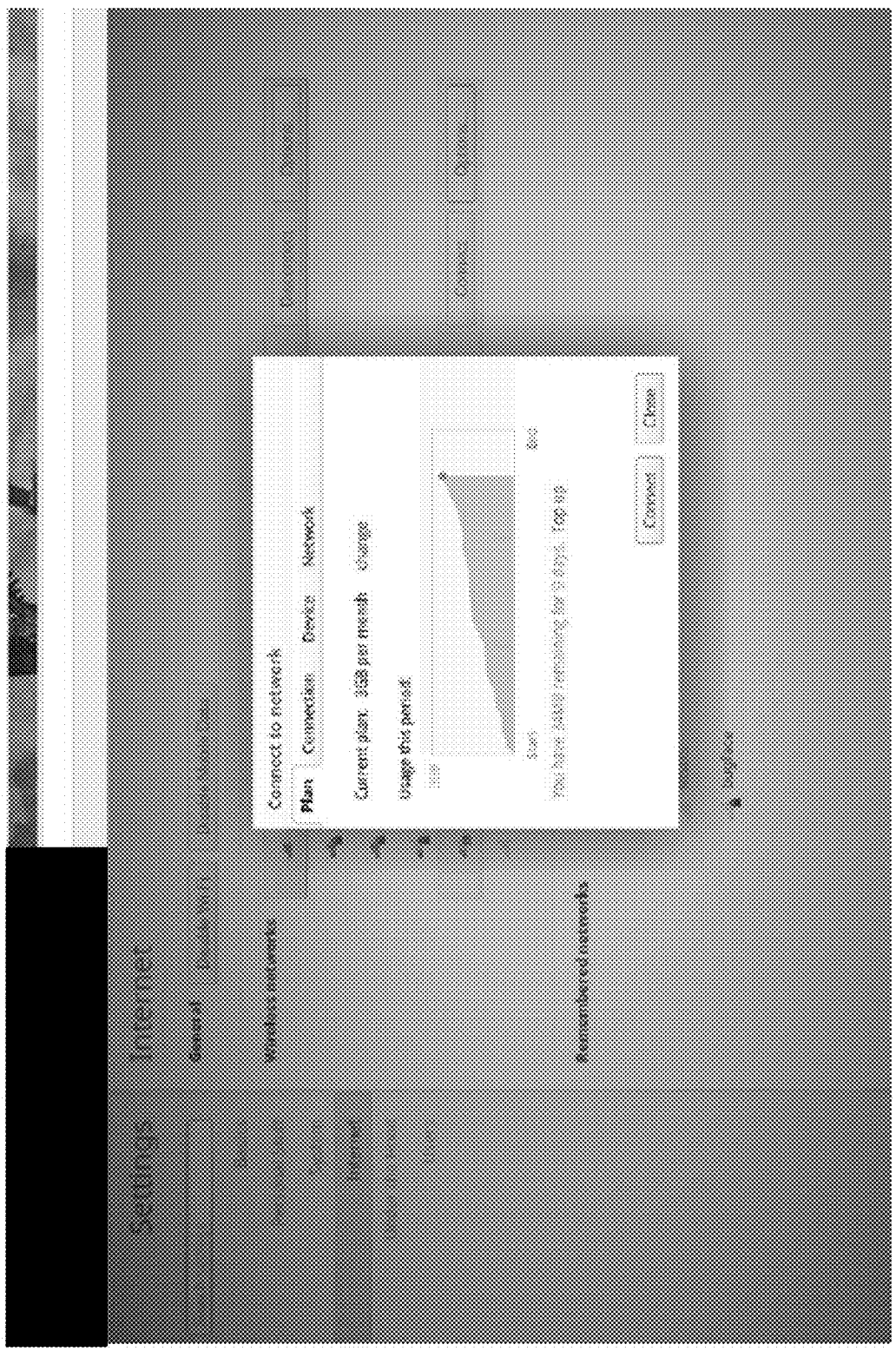
Figure 17:
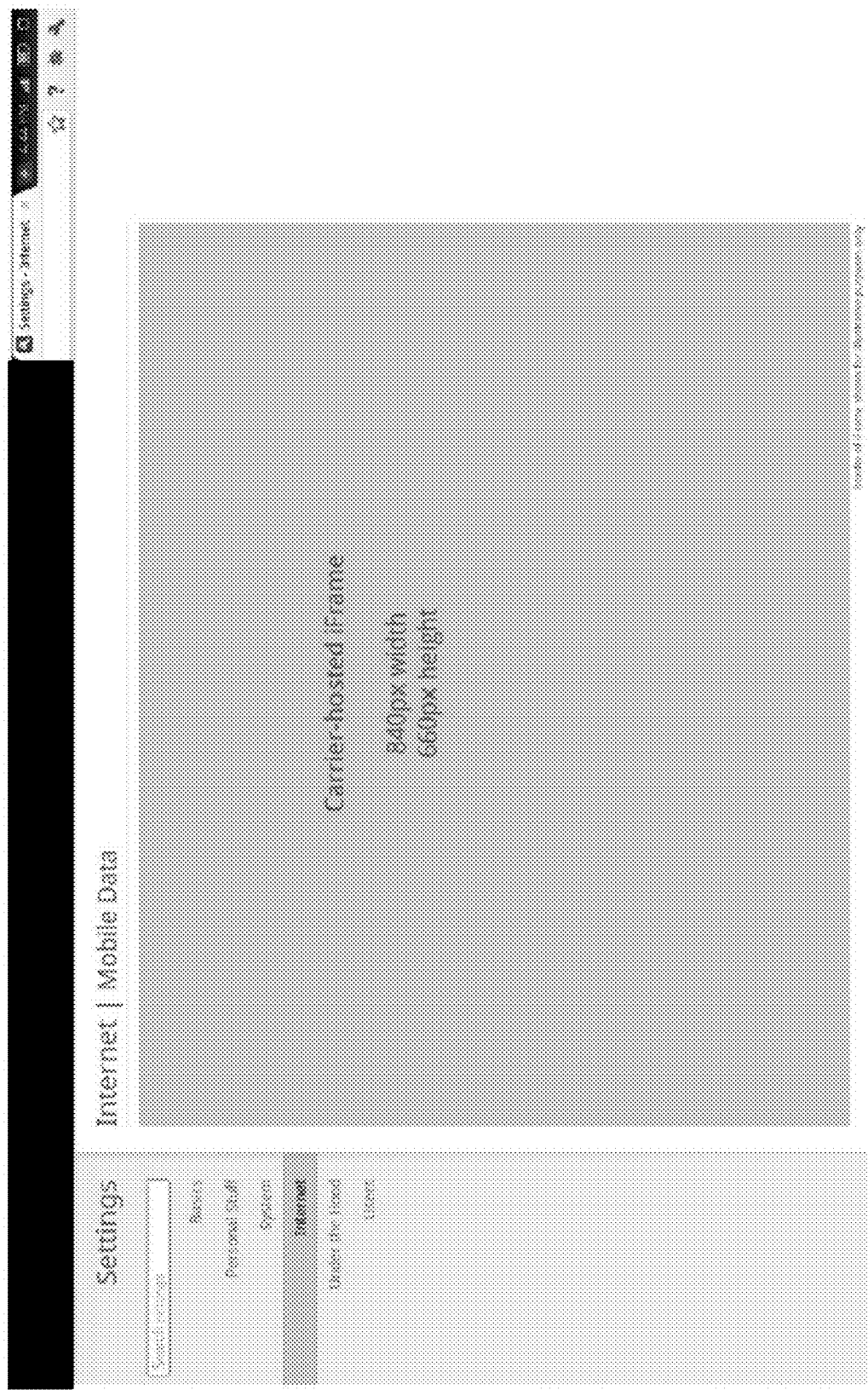

FIG. 16 is an example screen shot illustrating a popup box within the web browser of the computing device showing the connection details of the data plan after it has been activated on the computing device. FIG. 17 is an example screen shot showing the web browser of the computing device with an illustration showing that that the data plan web portal user interface can be displayed in an iFrame within the web browser.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
    receiving an indication to launch a web browser on a computing device;
    automatically pushing an offer to activate a data communication service for the computing device to communicate over a cellular network while the computing device is out of range of wireless local area networks other than the cellular network;
    launching the web browser for execution on the computing device, and displaying the offer in the web browser, in response to launching the browser while the computing device is out of range of the wireless local area networks other than the cellular network;
    establishing, through the web browser, a communication link between the computing device and a data plan web portal associated with a carrier of a data communication service and configured to receive information from a user of the computing device, the information being used to activate the data communication service;
    transmitting from the computing device, through the web browser, to the data plan web portal an encrypted message including a unique identifier of the computing device;
    receiving, through the web browser, at the computing device, a message including instructions to execute a process on the computing device to activate the data communication service for the computing device to communicate over the cellular network; and
    in response to receiving an indication to activate the data communication service for the computing device to communicate over the cellular network, displaying, in the web browser,
        at least one frame of a web page including a web browser menu that includes content provided by the web browser;
        an iFrame of the web page, the iFrame including a web portal user interface that includes content originating from the carrier of the data communication service;
    establishing the communication link between the computing device and the data plan web portal through an exchange of HTML5 messages within the web browser; and
    generating a web extension to provide access to activate the data communication service through an API that exposes a web extension for enabling permission to embed the content originating from the carrier of the data communication service into the web portal user interface.

2. The computer-implemented method of clam 1, wherein the encrypted message including a unique identifier of the computing device is encrypted with a public key of an operator of the data plan web portal.

3. The computer-implemented method of claim 1, further comprising:
    after receiving the message, associating a telephone number with the computing device and activating the data communication service for the computing device to communicate over the cellular network, wherein the telephone number is valid for using the computing device with the cellular network.

4. The computer-implemented method of claim 1, further comprising:
    detecting an internal state of the computing device, the internal state identifying whether the data communication service has been activated on the computing device; and
    displaying the offer to activate a data communication service for the computing device only when the detected internal state identifies that the data communication service has not been activated on the computing device.

5. The computer-implemented method of claim 1, wherein the process to activate the data communication service for the computing device to communicate over cellular network includes reconfiguring a modem of the computing device to communicate over the cellular network.

6. The computer-implemented method of claim 1, further comprising:
    transmitting payment information from the computing device to the data plan web portal to pay for the data communications service; and
    in response to the transmission of the payment information, receiving from the data plan web portal the message including instructions to execute the process to activate the data communication service, without receiving any of the payment information.

7. The computer-implemented method of claim 1, wherein activating the data communication service on the computing device includes reconfiguring a modem associated with the computing device from a pre-activation state to an activation state.

8. The computer-implemented method of claim 1, further comprising:

prior to sending the data plan web portal the encrypted message, encrypting the message with a public key associated with the carrier such that the data plan web portal can decrypt the encrypted message with a private key of the carrier.

9. The computer-implemented method of claim 1, wherein the data communication service is a 3G or 4G data service.

10. The method of claim 1, further comprising, after transmitting from the computing device, through the web browser, to the data plan web portal the encrypted message including the unique identifier of the computing device, placing the computing device into a pre-activation state in which the computing device can communicate over the cellular network through a captive portal to send and receive information needed to activate the data communication service for the computing device to communicate over the cellular network, but in which the computing device cannot communicate outside the captive portal over the cellular network.

11. A computing device comprising:
a modem configured to be capable of communicating over a cellular network;
one or more processors configured for executing instructions; and
one or more memory devices configured for storing instructions executable by the one or more memories, the instructions including instructions to:
receive an indication to launch a web browser on a computing device;
automatically push an offer to activate a data communication service for the computing device to communicate over a cellular network while the computing device is out of range of wireless local area networks other than the cellular network;
launch the web browser for execution on the computing device, and display the offer in the web browser, in response to launching the browser while the computing device is out of range of wireless local area networks other than the cellular network;
establish, through the web browser, a communication link between the computing device and a data plan web portal associated with a carrier of a data communication service and configured to receive information from a user of the computing device, the information being used to activate the data communication service;
transmit from the computing device, through the web browser, to the data plan web portal an encrypted message including a unique identifier of the computing device;
receive, through the web browser, at the computing device, a message including instructions to execute a process on the computing device to activate the data communication service for the modem of the computing device to communicate over the cellular network;
in response to receiving an indication to activate the data communication service for the computing device to communicate over the cellular network, displaying, in the web browser,
at least one frame of a web page including a web browser menu that includes content provided by the web browser; and
an iFrame of the web page, the iFrame including a web portal user interface that includes content originating from the carrier of the data communication service,
establish the communication link between the computing device and the data plan web portal through an exchange of HTML5 messages within the web browser; and
generate a web extension to provide access to activate the data communication service through an API that exposes a web extension for enabling permission to embed the content originating from the carrier of the data communication service into the web portal user interface.

12. The computing device of claim 11, wherein the encrypted message including the unique identifier of the computing device is encrypted with a public key of an operator of the data plan web portal.

13. The computing device of claim 11, wherein the instructions further include instructions to:
after receiving the message, associate a telephone number with the computing device and activate the data communication service for the computing device to communicate over the cellular network, wherein the telephone number is valid for using the computing device with the cellular network.

14. The computing device of claim 11, wherein the instructions further include instructions to:
detect an internal state of the computing device, the internal state identifying whether the data communication service has been activated on the computing device; and
display the offer to activate a data communication service for the computing device only when the detected internal state identifies that the data communication service has not been activated on the computing device.

15. The computing device of claim 11, wherein the process to activate the data communication service for the computing device to communicate over cellular network includes reconfiguring the modem of the computing device to communicate over the cellular network.

16. The computing device of claim 11, wherein the instructions further include instructions to:
transmit payment information from the computing device to the data plan web portal to pay for the data communications service; and
in response to the transmission of the payment information, receive from the data plan web portal the message including instructions to execute the process to activate the data communication service, without receiving any of the payment information.

17. The computing device of claim 11, wherein activating the data communication service on the computing device includes reconfiguring the modem associated with the computing device from a pre-activation state to an activation state.

18. The computing device of claim 11, wherein the instructions further include instructions to:
prior to sending the data plan web portal the encrypted message, encrypt the message with a public key associated with the carrier such that the data plan web portal can decrypt the encrypted message with a private key of the carrier.

19. The computing device of claim 11, wherein the data communication service is a 3G or 4G data service.

20. The computing device of claim 11, wherein the instructions further include instructions to:
after transmitting from the computing device, through the web browser, to the data plan web portal the encrypted message including the unique identifier of the computing device, place the computing device into a pre-activation state in which the computing device can communicate with the over the cellular network through a captive portal to send and receive information needed to activate the data communication service for the computing device to communicate over the cellular network, but in which the computing device cannot communicate outside the captive portal over the cellular network.

\* \* \* \* \*